United States Patent Office 2,888,445
Patented May 26, 1959

2,888,445

THIOCARBAMYL AMINE DISULFIDE ACCELERATORS

Albert F. Hardman, Northampton Township, Summit County, Ohio, assignor to The Goodyear Tire & Rubber Company, Akron, Ohio, a corporation of Ohio No Drawing. Application October 3, 1955
Serial No. 538,273

10 Claims. (Cl. 260—79.5)

This invention relates to the vulcanization of rubber and, more particularly, relates to a new class of compounds which are curing agents and accelerators of vulcanization of rubber.

It is an object of this invention to provide a new class of accelerators of vulcanization of rubber. It is another object of this invention to provide new compounds which are curing agents for rubber and which are also accelerators for the vulcanization of rubber with sulfur. Other objects will appear hereinafter as the description of this invention proceeds.

The thiocarbamyl-amine-disulfides are a new class of compounds. They are very effective in curing rubber in the absence of free sulfur and are also effective in accelerating the vulcanization of the cure in both natural and synthetic rubbers in the presence of sulfur. The new compounds are prepared by reacting one mol of carbon disulfide with one mol of an amine monosulfide.

The preparation of the compounds of this invention is illustrated by the following examples:

EXAMPLE 1

Ten grams of morpholine monosulfide (N,N'-thio-bis-morpholine) were added to 30 milliliters of methanol. Then 4.0 grams of carbon disulfide were added to this mixture. The mixture was refluxed for 10 to 15 minutes, all of the crystals of morpholine monosulfide going into solution. Shortly thereafter the solution set to a mass of white crystals. Twenty milliliters of methanol were added, the mixture was cooled and filtered. The product, after recrystallization from isopropyl alcohol, melted at 124–125° C. A yield of 9.0 grams was obtained. On analysis, the material was found to contain 34.23% of sulfur and 10.1% of nitrogen. The theoretical sulfur content for morpholino-thiocarbonyl-N-dithio-morpholine is 34.29% of sulfur and 9.99% of nitrogen.

EXAMPLE 2

Ten grams of piperidine monsulfide (N,N'-thio-bis-piperidine) were added to 50 milliliters of methanol. Four grams of carbon disulfide were then added, the solution became warm and in a few minutes set to a mass of crystals. An additional 25 milliliters of methanol were added, the mixture was stirred and allowed to stand for two hours at room temperature. It was then filtered and washed with methanol. After recrystallization from absolute alcohol a yield of 9.5 grams of product having a melting point of 85 to 86° C. was obtained. On analysis, the product was found to contain 34.85% of sulfur. The calculated sulfur content for piperidino-thiocarbonyl-N-dithio-piperidine is 34.8%.

EXAMPLE 3

Twenty-four grams of a 50% solution of dimethyl-amine monosulfide (N,N'-thio-bis-dimethylamine) in benzene were added to 50 milliliters of methanol. Eight grams of carbon disulfide were added and the solution became warm. After two hours, the solvent was distilled off under reduced pressure. The dimethyl-thiocarbamyl-dithio-dimethylamine was obtained as a residue of 14.0 grams of a brown liquid. This material was used without further purification as a vulcanization accelerator, it not being necessary to isolate the pure compounds for this purpose.

EXAMPLE 4

The thiocarbamyl derivative was prepared from diethylamine monosulfide (N,N'-thio-bis-diethylamine) as in Example 3, the diethyl-thiocarbamyl-dithiodiethylamine being obtained as an oil.

The vulcanization of rubber by the use of compounds of the class of this invention is illustrated in the following tables. The stocks were milled on a conventional two-roll rubber mill until the compounding ingredients were thoroughly mixed with the rubber and a homogeneous composition was obtained. The proportions of the various materials used are expressed as parts by weight.

The vulcanization of GR–S rubber by the use of compounds of the class of this invention is illustrated in Tables 1 and 2 using several representative compounds as accelerators of vulcanization.

Table 1

|  | A | B | C | D |
|---|---|---|---|---|
| GR–S synthetic rubber | 100 | 100 | 100 | 100 |
| Philblack O | 50 | 50 | 50 | 50 |
| Stearic acid | 3 | 3 | 3 | 3 |
| Petroleum residue softener | 5 | 5 | 5 | 5 |
| Zinc oxide | 3 | 3 | 3 | 3 |
| Sulfur | 1.75 | 1.75 | 1.75 | 1.75 |
| Product of Example 1 | .5 |  |  |  |
| Product of Example 2 |  | .5 |  |  |
| Product of Example 3 |  |  | .5 |  |
| Product of Example 4 |  |  |  | .5 |

Table 2

| Cure in Minutes at 285° C. | Ultimate Tensile Strength in Pounds Per Square Inch | | | |
|---|---|---|---|---|
| 15 | 3,100 | 3,530 | 2,950 | 3,500 |
| 30 | 3,560 | 3,700 | 3,560 | 3,600 |
| 45 | 3,500 | 3,450 | 3,500 | 3,600 |
| 60 | 3,580 | 3,400 | 3,630 | 3,460 |

| | Elongation in percent | | | |
|---|---|---|---|---|
| 15 | 680 | 440 | 630 | 550 |
| 30 | 560 | 400 | 540 | 460 |
| 45 | 500 | 360 | 480 | 430 |
| 60 | 480 | 350 | 480 | 400 |

| | Modulus at 300% Elongation in Pounds Per Square Inch | | | |
|---|---|---|---|---|
| 15 | 1,275 | 2,350 | 1,150 | 1,775 |
| 30 | 1,850 | 2,700 | 1,850 | 2,150 |
| 45 | 2,025 | 2,800 | 1,975 | 2,325 |
| 60 | 2,175 | 2,900 | 2,025 | 2,400 |

Table 3 shows the use of the accelerator morpholino-thiocarbonyl-N-dithio-morpholine in the cure of natural rubber.

Table 3.—Compound formula

| | |
|---|---|
| Smoked sheet | 100 |
| Philblack O | 50 |
| Zinc oxide | 3 |
| Sulfur | 2.5 |
| Stearic acid | 3 |
| Petroleum residue softener | 3 |
| Pine tar | 2 |
| Product Example 1 | .25 |

The above stock was cured by heating in a press at

275° F. The physical properties are listed in Table 4 below.

Table 4

| Cure in Minutes at 275° F. | Ultimate Tensile Strength in Pounds Per Square Inch |
|---|---|
| 15 | 3,150 |
| 30 | 3,375 |
| 45 | 3,250 |
| 60 | 3,300 |

| | Elongation in Percent |
|---|---|
| 15 | 540 |
| 30 | 540 |
| 45 | 510 |
| 60 | 520 |

| | Modulus at 300% Elongation in Pounds Per Square Inch |
|---|---|
| 15 | 1,400 |
| 30 | 1,525 |
| 45 | 1,575 |
| 60 | 1,575 |

The compounds of the class of this invention are effective curing agents for rubber without free sulfur being present. In Tables 5 and 6 below the material, morpholinothiocarbonyl-N-dithio-morpholine, was tested in comparison with tetramethyl thiuram disulfide as a standard in a non-sulfur GR–S stock.

Table 5

| | E | F |
|---|---|---|
| GR-S synthetic rubber | 100 | 100 |
| Philblack O | 50 | 50 |
| Zinc oxide | 3 | 3 |
| Stearic acid | 3 | 3 |
| Petroleum residue softener | 5 | 5 |
| Tetramethyl thiuram disulfide | 2.5 | |
| Morpholino-thiocarbonyl-N-dithiomorpholine | | 2.5 |

Table 6

| Cure in Minutes at 285° F. | Ultimate Tensile Strength in Pounds Per Square Inch | |
|---|---|---|
| 15 | 2,950 | 1,400 |
| 30 | 3,090 | 3,390 |
| 45 | 3,260 | 3,360 |
| 60 | 3,240 | 3,410 |
| 90 | 3,040 | 3,360 |

| | Elongation in Percent | |
|---|---|---|
| 15 | 670 | 750 |
| 30 | 580 | 610 |
| 45 | 600 | 580 |
| 60 | 590 | 570 |
| 90 | 540 | 570 |

| | Modulus at 300% Elongation in Pounds Per Square Inch | |
|---|---|---|
| 15 | 1,000 | 375 |
| 30 | 1,300 | 1,350 |
| 45 | 1,300 | 1,475 |
| 60 | 1,350 | 1,500 |
| 90 | 1,350 | 1,475 |

(In the above tables Philblack O is a fast curing furnace black.)

As a non-sulfur curing agent the morpholino-thiocarbonyl-N-dithio-morpholine is much less scorchy than is tetramethyl thiuram disulfide, yet gives higher tensile strengths and 300% modulus figures. It is also non-blooming, whereas tetramethyl thiuram disulfide blooms out of the stock when used in large amounts.

The examples and the tables above illustrate the invention with respect to the acceleration of the vulcanization of natural and synthetic rubber. Since the accelerators of the class of this invention are somewhat scorchy in natural rubber the preferred use is in the acceleration of the vulcanization of synthetic rubber and as non-sulfur curing agents for synthetic rubber such as the rubbery butadiene-styrene copolymers, the rubbery butadiene-acrylonitrile copolymers, butyl rubbers and other rubber-like materials obtained by the polymerization of diene hydrocarbons.

The materials of the class of this invention can be used in various proportions, in accordance with the usual practices in this art, from 0.25 to 5.0 parts being sufficient for most purposes. These materials can be used in conjunction with other accelerators such as thiazoles, dithiocarbamates, thiuram disulfides and other accelerators, if desired. They may also be used in conjunction with activators and the pigments, oils, waxes, tackifying agents and other compounding ingredients used in rubber goods. The compounds of the class of this invention have the general formula

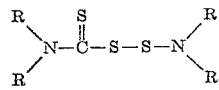

in which the R's are the same or different radicals selected from the group consisting of methyl, ethyl, n-propyl, n-butyl, benzyl, furfuryl and tetrahydrofurfuryl radicals and the R's on a single nitrogen may together form a single chain or ring, as in the morpholinyl and piperidyl radicals. They are prepared by reacting one mol of carbon disulfide with one mol of an amine monosulfide of the general formula

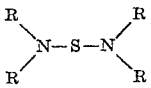

in which the R's are the same or different radicals selected from the group consisting of methyl, ethyl, n-propyl, n-butyl, benzyl, furfuryl and tetrahydrofurfuryl radicals and the R's on a single nitrogen may together form a single chain or ring, as in the morpholinyl and piperidyl radicals. Representative examples of amine monosulfides are N,N'-thio-bis-dimethylamine, N,N'-thio-bis-diethylamine, N,N'-thio-bis-di-n-propylamine, N,N'-thio-bis-di-n-butylamine, N,N'-thio-bis - morpholine, N,N'-thio-bis-piperidine, N,N'-thio-bis - dibenzylamine, N,N'-thio-bis-difurfurylamine, N,N'-thio-bis - ditetrahydrofurfurylamine, N-(dimethylamino - thio) - diethylamine, N-(dimethylamino-thio) - di-n-propylamine, N-(dimethylamino-thio) - di - n - butylamine, N-(diethylamino - thio) - di-n- propylamine, N-(diethylamino-thio)-di-n-butylamine, N-(dimethylamino - thio)-morpholine, N - (diethylamino-thio)-morpholine, N - (di-n-propylamino-thio)-morpholine, N-(di - n - butylamino-thio)- morpholine, N - (dimethylamino-thio)-piperidine, N - (diethylamino - thio) - piperidine, N - (di - n - propylamino-thio) - piperidine, N-(di-n-butylamino - thio)-piperidine, N-(dimethylamino-thio) - dibenzylamine, N-(di-n-butylamino-thio) - dibenzylamine, N - (dimethylamino - thio) - difurfurylamine, N-(di-n-butylamino-thio)-difurfurylamine, N-(piperidino - thio) - morpholine, N-(dibenzylamino-thio)-morpholine, N-(difurfurylamino - thio) - morpholine, N - (ditetrahydrofurfurylamno-thio)-morpholine, N-(dibenzylamino-thio)-piperidine, N-(difurfurylamino - thio) - piperidine, and N-(ditetrahydrofurfurylamine-thio)-piperidine. The reaction of these amine sulfides with carbon bisulfide gives the corresponding accelerator compounds, as illustrated in Examples 1 to 4.

The examples illustrate the preparation of these materials at moderate temperatures. Other temperatures can be used, with appropriate adjustment of the time of reaction. The temperature is not critical, but it is desirable to use a temperature that will give reasonably fast reaction rates so that the process may be economically carried out. In preparing these materials solvents may be present. Solvents which have been found to be suitable are the lower aliphatic alcohols such as methanol, ethanol, isopropanol, normal propanol and normal butanol.

While certain representative embodiments and details have been shown for the purpose of illustrating the invention, it will be apparent to those skilled in this art that various changes and modifications may be made therein without departing from the spirit or scope of the invention.

I claim:
1. The method of vulcanizing a rubber selected from the group consisting of natural rubber, butyl rubbers and rubber-like materials obtained by the polymerization of diene hydrocarbons which comprises heating the rubber in the presence of from 0.25 to 5.0 parts based on the rubber used of a thiocarbamyl-amine-disulfide of the general formula

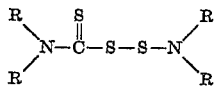

in which the R's are alkyl radicals selected from the group consisting of methyl, ethyl, n-propyl, n-butyl, benzyl, furfuryl and tetrahydrofurfuryl radicals and the R's on a single nitrogen atom may together form a single ring.

2. The method of vulcanizing rubber which comprises heating rubber in the presence of from 0.25 to 5.0 parts based on the rubber used of morpholino-thiocarbonyl-N-dithio morpholine.

3. The method of vulcanizing rubber which comprises heating rubber in the presence of from 0.25 to 5.0 parts based on the rubber used of piperidino-thiocarbonyl-N-dithio-piperidine.

4. The vulcanized rubber product obtained by heating a rubber selected from the group consisting of natural rubber, butyl rubbers and rubber-like materials obtained by the polymerization of diene hydrocarbons in the presence of from 0.25 to 5.0 parts based on the rubber used of a thiocarbamyl-amine-disulfide of the general formula

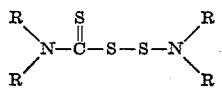

in which the R's are alkyl radicals selected from the group consisting of methyl, ethyl, n-propyl, n-butyl, benzyl, furfuryl and tetrahydrofurfuryl radicals and the R's on a single nitrogen atom may together form a single ring.

5. The vulcanized rubber product obtained by heating rubber in the presence of from 0.25 to 5.0 parts based on the rubber used of morpholino-thiocarbonyl-N-dithio-morpholine.

6. The vulcanized rubber product obtained by heating rubber in the presence of piperidino-thiocarbonyl-N-dithio-piperidine.

7. The method of vulcanizing rubbery butadiene-styrene copolymer which comprises heating the copolymer in the presence of from 0.25 to 5.0 parts based on the rubber used of a thiocarbamyl-amine-disulfide of the general formula

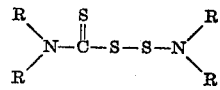

in which the R's are alkyl radicals selected from the group consisting of methyl, ethyl, n-propyl, n-butyl, benzyl, furfuryl and tetrahydrofurfuryl radicals and the R's on a single nitrogen atom may together form a single ring, but in the absence of added free sulfur.

8. The method of vulcanizing rubbery butadiene-styrene copolymer which comprises heating the copolymer with from 0.25 to 5.0 parts based on the copolymer of morpholino-thiocarbonyl-N-dithio-morpholine, but in the absence of added free sulfur.

9. The method of vulcanizing rubbery butadiene-styrene copolymers which comprises heating the copolymer with from 0.25 to 5.0 parts based on the copolymer of piperidino-thiocarbonyl-N-dithio-piperidine, but in the absence of added free sulfur.

10. A vulcanizable composition comprising a rubber selected from the group consisting of natural rubber, butyl rubbers and rubber-like materials obtained by the polymerization of diene hydrocarbons and from 0.25 to 5.0 parts based on the rubber used of a thiocarbamyl-amine-disulfide of the general formula

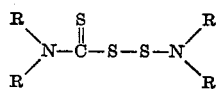

in which the R's are radicals selected from the group consisting of methyl, ethyl, n-propyl, n-butyl, benzyl, furfuryl and tetrahydrofurfuryl radicals and the R's on a single nitrogen atom may together form a single ring.

References Cited in the file of this patent
UNITED STATES PATENTS

| 2,333,468 | Cooper | Nov. 2, 1943 |
| 2,390,713 | Hunt | Dec. 11, 1945 |
| 2,461,953 | Bargmeyer | Feb. 15, 1949 |
| 2,555,024 | Brooks | May 29, 1951 |
| 2,581,905 | Carr et al. | Jan. 8, 1952 |
| 2,666,043 | Carr et al. | Jan. 12, 1954 |
| 2,692,862 | Lipsitz | Oct. 26, 1954 |

OTHER REFERENCES

Blake, J.A.C.S., vol. 65, July 9, 1943, p. 1267–1269. (Copy in Scientific Library.)